(12) United States Patent
Tian et al.

(10) Patent No.: US 10,833,518 B2
(45) Date of Patent: Nov. 10, 2020

(54) CHARGE CONTROL METHOD AND DEVICE, AND ELECTRONIC DEVICE

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 178 days.

(21) Appl. No.: 15/325,581

(22) PCT Filed: Sep. 22, 2015

(86) PCT No.: PCT/CN2015/090271
§ 371 (c)(1),
(2) Date: Jan. 11, 2017

(87) PCT Pub. No.: WO2017/049459
PCT Pub. Date: Mar. 30, 2017

(65) Prior Publication Data
US 2017/0294790 A1    Oct. 12, 2017

(51) Int. Cl.
*H02J 7/00* (2006.01)
*H02J 7/04* (2006.01)

(52) U.S. Cl.
CPC .............. *H02J 7/0029* (2013.01); *H02J 7/00* (2013.01); *H02J 7/0045* (2013.01);
(Continued)

(58) Field of Classification Search
CPC ........ H02J 7/0029; H02J 7/045; H02J 7/0047; H02J 7/0045; H02J 7/0068; H02J 7/00
(Continued)

(56) References Cited

U.S. PATENT DOCUMENTS 5,510,690 A * 4/1996 Tanaka .................... G06F 1/263
                                                    320/106
5,686,808 A * 11/1997 Lutz ....................... H01M 10/44
                                                    320/106
(Continued)

FOREIGN PATENT DOCUMENTS

CN       2606979 Y      3/2004
CN       1838503 A      9/2006
(Continued)

OTHER PUBLICATIONS

Office Action issued in the counterpart Australian Patent Application No. 2015401874, dated Dec. 13, 2017 (3 pages).
(Continued)

*Primary Examiner* — John T Trischler
(74) *Attorney, Agent, or Firm* — Osha Liang LLP

(57) ABSTRACT

The present disclosure provides a charge control method and device and an electronic device, applied in the electronic device, in which the electronic device includes a charging interface, a charging circuit and a battery coupled in series. The method includes: when a charging device is coupled with the charging interface, determining, by a charge control device, a charging mode supported by the charging device as the high voltage charging mode or the low voltage charging mode, in which a charging voltage of the high voltage charging mode is greater than a charging voltage of the low voltage charging mode, and controlling the charging circuit by the charge control device according to the charging mode supported by the charging device, such that the charging circuit charges the battery in the charging mode supported by the charging device.

16 Claims, 4 Drawing Sheets

(52) U.S. Cl.
CPC .......... *H02J 7/0047* (2013.01); *H02J 7/0068* (2013.01); *H02J 7/045* (2013.01); *H02J 7/00034* (2020.01); *H02J 7/00045* (2020.01)

(58) Field of Classification Search
USPC ........................................................ 320/109
See application file for complete search history.

(56) References Cited

U.S. PATENT DOCUMENTS

| | | | | |
|---|---|---|---|---|
| 6,075,340 A * | 6/2000 | Koenck | ............... | H01M 2/1055 320/112 |
| 6,157,242 A * | 12/2000 | Fukui | ............... | H02M 3/073 327/536 |
| 6,275,006 B1 * | 8/2001 | Koike | ............... | H02J 7/0073 320/125 |
| 6,495,992 B1 * | 12/2002 | Pavlovic | ............... | H02J 7/0006 320/161 |
| 7,271,568 B2 * | 9/2007 | Purdy | ............... | H02J 7/0052 320/106 |
| 7,279,855 B2 * | 10/2007 | Tahara | ............... | B60K 6/26 318/46 |
| RE40,223 E * | 4/2008 | Koike | ............... | H02J 7/0073 320/125 |
| 7,375,491 B2 * | 5/2008 | Lin | ............... | H02J 7/0073 320/107 |
| 7,605,568 B2 * | 10/2009 | Gangstoe | ............... | H02J 7/0075 320/128 |
| 7,683,571 B2 * | 3/2010 | Takamatsu | ............... | H02J 7/0004 320/106 |
| 7,750,604 B2 * | 7/2010 | Hartular | ............... | H01M 10/44 320/132 |
| 7,999,516 B2 * | 8/2011 | Hartular | ............... | H01M 10/44 320/139 |
| 8,139,382 B2 * | 3/2012 | Zhang | ............... | G05F 1/67 363/41 |
| 8,237,399 B2 * | 8/2012 | Lin | ............... | H02J 7/0029 320/106 |
| 8,497,662 B2 * | 7/2013 | Aradachi | ............ | H01M 10/4221 320/106 |
| 8,723,479 B2 * | 5/2014 | Kim | ............... | H01M 10/46 320/112 |
| 8,810,214 B2 * | 8/2014 | Van Dijk | ............... | H02M 3/158 323/266 |
| 9,030,171 B2 * | 5/2015 | Wu | ............... | H02J 7/0003 320/137 |
| 9,099,877 B2 * | 8/2015 | Banos | ............... | H02J 7/0021 |
| 9,136,724 B2 * | 9/2015 | Ye | ............... | H02J 7/0068 |
| 9,184,603 B2 * | 11/2015 | Lee | ............... | H02J 7/0003 |
| 9,203,254 B2 * | 12/2015 | Balmefrezol | ............ | G06F 1/263 |
| 9,236,764 B2 * | 1/2016 | Kidera | ............... | H01M 10/44 |
| 9,246,348 B2 * | 1/2016 | Solie | ............... | H02J 7/04 |
| 9,247,598 B2 * | 1/2016 | Maglica | ............... | F21L 4/045 |
| 9,261,934 B2 * | 2/2016 | Uan-Zo-Li | ............... | G06F 1/263 |
| 9,270,140 B2 * | 2/2016 | Groat | ............... | H02J 7/045 |
| 9,312,719 B2 * | 4/2016 | Claus | ............... | H01M 2/34 |
| 9,341,681 B2 * | 5/2016 | Kobayakawa | ...... | H01M 10/486 |
| 9,350,197 B2 * | 5/2016 | Yan | ............... | H02J 7/045 |
| 9,385,556 B2 * | 7/2016 | Groat | ............... | H02J 7/045 |
| 9,413,186 B2 * | 8/2016 | Groat | ............... | H02J 7/045 |
| 9,416,950 B2 * | 8/2016 | Maglica | ............... | F21L 4/045 |
| 9,431,833 B2 * | 8/2016 | Hashimoto | ............ | H01M 10/48 |
| 9,490,644 B2 * | 11/2016 | Chang | ............... | H02J 7/0052 |
| 9,509,164 B2 * | 11/2016 | Groat | ............... | H02J 7/045 |
| 9,512,991 B2 * | 12/2016 | Maglica | ............... | F21L 4/045 |
| 9,548,620 B2 * | 1/2017 | Hu | ............... | C02F 1/4691 |
| 9,564,769 B2 * | 2/2017 | Poulton | ............... | H02J 7/007 |
| 9,577,475 B2 * | 2/2017 | Akiyoshi | ............... | H02J 50/70 |
| 9,590,436 B2 * | 3/2017 | Sporck | ............... | H02J 7/0052 |
| 9,612,643 B2 * | 4/2017 | Uan-Zo-Li | ............... | G06F 1/3234 |
| 9,660,472 B2 * | 5/2017 | Poulton | ............... | H02J 7/007 |
| 9,673,638 B2 * | 6/2017 | Bastami | ............... | H02J 7/0008 |
| 9,687,663 B2 * | 6/2017 | He | ............... | A61N 1/08 |
| 9,735,600 B2 * | 8/2017 | Ye | ............... | H02J 7/0068 |
| 9,751,421 B2 * | 9/2017 | Kinomura | ............... | B60L 58/12 |
| 9,800,071 B2 * | 10/2017 | Martaeng | ............... | H02J 7/0068 |
| 9,825,478 B2 * | 11/2017 | Odaohhara | ............ | H02J 7/0063 |
| 9,831,780 B2 * | 11/2017 | Hong | ............... | H02M 3/1582 |
| 9,843,211 B2 * | 12/2017 | Sattinger | ............... | H02J 7/0055 |
| 9,882,418 B2 * | 1/2018 | Hsu | ............... | B60L 53/16 |
| 9,887,560 B2 * | 2/2018 | Banos | ............... | H02J 7/0021 |
| 9,899,925 B2 * | 2/2018 | Sheng | ............... | H02M 3/33507 |
| 9,906,059 B2 * | 2/2018 | Hang | ............... | H02J 7/0068 |
| 9,933,146 B2 * | 4/2018 | Maglica | ............... | F21L 4/027 |
| 9,935,490 B2 * | 4/2018 | Zhang | ............... | H02J 7/0031 |
| 9,991,725 B2 * | 6/2018 | Song | ............... | H02J 7/0052 |
| 9,997,940 B2 * | 6/2018 | Xu | ............... | H02J 2207/20 |
| 10,003,205 B2 * | 6/2018 | Kaji | ............... | H02J 7/0029 |
| 10,008,860 B2 * | 6/2018 | Poulton | ............... | H02J 7/007 |
| 10,020,664 B2 * | 7/2018 | Poulton | ............... | G01R 31/378 |
| 10,075,007 B2 * | 9/2018 | Langlinais | ............... | G06F 1/263 |
| 10,110,029 B2 * | 10/2018 | Toya | ............... | H02J 7/0047 |
| 10,118,045 B2 * | 11/2018 | He | ............... | A61N 1/08 |
| 10,135,263 B2 * | 11/2018 | Jung | ............... | H02J 7/0055 |
| 10,186,895 B2 * | 1/2019 | Zhang | ............... | H02J 7/0031 |
| 10,193,452 B2 * | 1/2019 | Sheng | ............... | H02M 3/33507 |
| 10,199,837 B2 * | 2/2019 | Jung | ............... | H02J 7/00036 |
| 10,220,709 B2 * | 3/2019 | Malek | ............... | H02J 7/35 |
| 10,250,048 B2 * | 4/2019 | Wen | ............... | H02H 7/18 |
| 10,476,287 B2 * | 11/2019 | Daniel | ............... | H02J 7/342 |
| 2005/0077878 A1 * | 4/2005 | Carrier | ............... | B25F 5/00 320/134 |
| 2005/0174094 A1 * | 8/2005 | Purdy | ............... | H02J 7/0052 320/134 |
| 2006/0022638 A1 | 2/2006 | Lai et al. | | |
| 2006/0145658 A1 * | 7/2006 | Wang | ............... | H02J 7/0047 320/107 |
| 2006/0152180 A1 * | 7/2006 | Tahara | ............... | B60K 6/26 318/139 |
| 2007/0194759 A1 * | 8/2007 | Shimizu | ............... | H02J 2207/20 320/166 |
| 2007/0214296 A1 * | 9/2007 | Takamatsu | ............ | H02J 7/0004 710/63 |
| 2007/0273340 A1 * | 11/2007 | Miller | ............... | H02M 3/1582 323/224 |
| 2008/0122400 A1 * | 5/2008 | Kubota | ............... | H02J 7/0004 320/106 |
| 2008/0197811 A1 | 8/2008 | Hartular et al. | | |
| 2009/0108804 A1 * | 4/2009 | Aradachi | ............ | H01M 10/4221 320/106 |
| 2009/0273319 A1 | 11/2009 | Young et al. | | |
| 2010/0085008 A1 * | 4/2010 | Suzuki | ............... | B25F 5/00 320/112 |
| 2010/0219775 A1 * | 9/2010 | Maglica | ............... | F21L 4/045 315/362 |
| 2010/0264882 A1 * | 10/2010 | Hartular | ............... | H01M 10/44 320/139 |
| 2011/0057620 A1 * | 3/2011 | Tsai | ............... | H02J 7/0031 320/134 |
| 2011/0234151 A1 | 9/2011 | Uan-Zo-li et al. | | |
| 2012/0274279 A1 * | 11/2012 | Banos | ............... | H02J 7/0021 320/112 |
| 2013/0076301 A1 | 3/2013 | Bastami | | |
| 2013/0154550 A1 * | 6/2013 | Balmefrezol | ............ | G06F 1/263 320/107 |
| 2013/0207592 A1 * | 8/2013 | Okada | ............... | B60L 3/0046 320/106 |
| 2014/0009120 A1 | 1/2014 | Kim | | |
| 2014/0152267 A1 * | 6/2014 | Hashimoto | ............ | H01M 10/48 320/134 |
| 2014/0217956 A1 * | 8/2014 | Kinomura | ............... | H02J 7/0027 320/101 |
| 2014/0292278 A1 | 10/2014 | Wu | | |
| 2014/0300321 A1 | 10/2014 | Kim et al. | | |
| 2014/0300366 A1 * | 10/2014 | Kobayakawa | ...... | H01M 10/486 324/433 |
| 2014/0340024 A1 * | 11/2014 | Groat | ............... | H02J 7/045 320/107 |
| 2014/0347003 A1 * | 11/2014 | Sporck | ............... | H02J 7/0052 320/107 |

(56) References Cited

U.S. PATENT DOCUMENTS

| | | | |
|---|---|---|---|
| 2015/0069956 A1* | 3/2015 | Hu | H02J 7/0052 320/107 |
| 2015/0069957 A1* | 3/2015 | Chang | H02J 7/0052 320/107 |
| 2015/0069958 A1* | 3/2015 | Yang | H02J 7/0052 320/107 |
| 2015/0069983 A1* | 3/2015 | Hawawini | H02M 3/1588 323/271 |
| 2015/0280457 A1* | 10/2015 | Jung | H02J 7/0004 320/106 |
| 2015/0280486 A1* | 10/2015 | Hsu | B60L 53/16 320/107 |
| 2015/0311738 A1* | 10/2015 | Odaohhara | H02J 7/0063 320/128 |
| 2015/0326046 A1* | 11/2015 | Song | H02J 7/0052 320/107 |
| 2015/0380954 A1* | 12/2015 | Poulton | H02J 7/007 320/106 |
| 2016/0056657 A1* | 2/2016 | Hang | H02J 7/0068 320/128 |
| 2016/0064986 A1* | 3/2016 | Langlinais | G06F 1/263 320/134 |
| 2016/0087464 A1* | 3/2016 | Groat | H02J 7/045 320/157 |
| 2016/0087465 A1* | 3/2016 | Groat | H02J 7/045 320/162 |
| 2016/0087466 A1* | 3/2016 | Groat | H02J 7/045 320/162 |
| 2016/0087472 A1* | 3/2016 | Sattinger | H02J 7/0055 320/108 |
| 2016/0134136 A1* | 5/2016 | Poulton | H02J 7/007 320/106 |
| 2016/0178176 A1* | 6/2016 | Maglica | F21L 4/045 362/157 |
| 2016/0183341 A1* | 6/2016 | Maglica | F21L 4/045 315/307 |
| 2016/0248269 A1* | 8/2016 | Martaeng | H02J 7/0068 |
| 2016/0315490 A1* | 10/2016 | Xu | H02J 7/342 |
| 2016/0344227 A1* | 11/2016 | Zhang | H02J 7/0031 |
| 2017/0033575 A1* | 2/2017 | Kaji | H02J 7/0029 |
| 2017/0051903 A1* | 2/2017 | Maglica | F21L 4/027 |
| 2017/0085108 A1* | 3/2017 | Zhang | H02J 7/00 |
| 2017/0126022 A1* | 5/2017 | Poulton | H02J 7/007 |
| 2017/0126040 A1* | 5/2017 | Poulton | H02J 7/007 |
| 2017/0133867 A1* | 5/2017 | Banos | H02J 7/0021 |
| 2017/0170734 A1* | 6/2017 | Sheng | H02M 3/33507 |
| 2017/0237271 A1* | 8/2017 | Kelly-Morgan | H02J 7/0026 320/166 |
| 2017/0271897 A1* | 9/2017 | Wen | H02H 7/18 |
| 2017/0358945 A1* | 12/2017 | Zhang | H02J 7/0031 |
| 2018/0006479 A1* | 1/2018 | Daniel | H02J 7/342 |
| 2018/0039311 A1* | 2/2018 | Wang | H02M 5/293 |
| 2018/0048174 A1* | 2/2018 | Martaeng | H02J 7/0068 |
| 2018/0090945 A1* | 3/2018 | Langlinais | H02J 7/00 |
| 2018/0123463 A1* | 5/2018 | Sheng | H02M 3/33507 |
| 2018/0175659 A1* | 6/2018 | Zhang | H02J 7/0031 |
| 2018/0209628 A1* | 7/2018 | Maglica | F21L 4/027 |
| 2018/0248397 A1* | 8/2018 | Xu | H02J 7/342 |
| 2018/0278073 A1* | 9/2018 | Zhang | H02J 7/00 |
| 2018/0297476 A1* | 10/2018 | Malek | H02J 7/0068 |
| 2019/0097431 A1* | 3/2019 | Jung | H02J 7/0055 |
| 2019/0393702 A1* | 12/2019 | Su | H02J 7/0068 |

FOREIGN PATENT DOCUMENTS

| | | |
|---|---|---|
| CN | 101447686 A | 6/2009 |
| CN | 101682197 A | 3/2010 |
| CN | 103746437 A | 4/2014 |
| CN | 104104124 A | 10/2014 |
| EP | 2424067 A1 | 2/2012 |
| EP | 2887492 A2 | 6/2015 |
| EP | 3101757 A1 | 12/2016 |
| JP | 2009136097 A | 6/2009 |
| JP | 2010022170 A | 1/2010 |
| JP | 2011211894 A | 10/2011 |
| TW | 201232991 A | 8/2012 |
| TW | 201325052 A | 6/2013 |
| TW | 201334361 A | 8/2013 |
| TW | 201440371 A | 10/2014 |
| TW | 201448411 A | 12/2014 |
| TW | M502278 U | 6/2015 |
| WO | 2015113334 A1 | 8/2015 |

OTHER PUBLICATIONS

Office Action issued in the counterpart Korean Patent Application No. 2017-7002587, dated Nov. 1, 2017 (11 pages).

Office Action issued in the counterpart Taiwanese Patent Application No. 105118556, dated Feb. 6, 2017 (16 pages).

International Search Report issued in corresponding application No. PCT/CN2015/090271 dated Mar. 8, 2016 (2 pages).

Written Opinion of the International Searching Authority issued in corresponding application No. PCT/CN2015/090271 dated Mar. 8, 2016 (5 pages).

Office Action issued in corresponding European Application No. 15897896 dated Nov. 6, 2018 (5 pages).

Office Action issued in corresponding Japanese Application No. 2017-509752 dated Nov. 13, 2018, and English translation thereof (9 pages).

Office Action issued in corresponding Singaporean Application No. 11201700500W dated Dec. 21, 2018 (5 pages).

Office Action issued in the counterpart Taiwanese Patent Application No. 106129059 dated Dec. 3, 2018 (7 pages).

Office Action issued in corresponding European Application No. 15897896 dated Mar. 14, 2018, and English commmunication reporting the same (9 pages).

Office Action issued in corresponding Australian Application No. 2015401874 dated Apr. 30, 2018, and English commmunication reporting the same (4 pages).

Office Action issued in corresponding Singaporean Application No. 11201700500W dated May 3, 2018, and English commmunication reporting the same (9 pages).

Li, M. et al.; "Fast-charging trends and challenges for single-cell batteries using high input voltage"; https://www.electronicproducts.com/Analog_Mixed_Signal_ICs/Power_Management/Fast_charging_trends_and_challenges_for_single_cell_batteries_using_high_input_voltage.aspx; Feb. 7, 2015 (whole document).

Office Action issued in Japanese Application No. 2017-509752, dated Jul. 23, 2019 (5 pages).

Office Action issued in Singapore Application No. 11201700500W, dated Sep. 28, 2019 (7 pages).

Coles, Charles; "Buck-boost vs. buck converter: it's about battery life in portables;" EDN Network; Aug. 28, 2006 (5 pages).

"Buck converter;" Last edited Sep. 19, 2019; Accessed Sep. 24, 2019. Retrieved from the Internet: URL: http://web.archive.org/web/20150208232830/https://en.wikipedia.org/wiki/Buck_converter.

Office Action issued in corresponding MY Application No. PI 2017700196 dated May 21, 2020 (4 pages).

Examination Report issued in corresponding EP Application No. 15897896.5 dated Jun. 18, 2020 (4 pages).

\* cited by examiner

US 10,833,518 B2

1

CHARGE CONTROL METHOD AND DEVICE, AND ELECTRONIC DEVICE

CROSS-REFERENCE TO RELATED APPLICATIONS

This application is a US national phase application of an International Application No. PCT/CN2015/090271, filed on Sep. 22, 2015.

TECHNICAL FIELD

The present disclosure generally relates to a communication technical field, and more particularly, to a charge control method and device, and an electronic device.

BACKGROUND

With the popularization of electronic devices (such as mobile phones), how to charge the electronic devices becomes an important problem of the provider. In the related art, the electronic device can be charged in a high voltage charging mode or a low voltage charging mode. FIG. 1 illustrates a schematic circuit diagram of an electronic device 100. The electronic device 100 supports charging in the high voltage charging mode. The electronic device 100 may include a charging interface 110, a battery 140, and a charging circuit 120 and a control circuit 130 disposed between the charging interface 110 and the battery 140. The charging circuit 120 can be referred to as a BUCK circuit, mainly including a MOSFET (Metal-Oxide-Semiconductor Field Effect Transistor) transistor 1 (MOSFET-1), a MOSFET transistor 2 (MOSFET-2), an inductor and a capacitor, in which the MOSFET-1 and the MOSFET-2 are turned on alternately during the charging.

FIG. 2 illustrates a schematic circuit diagram of another electronic device 200. The electronic device 200 may include a charging interface 210, a battery 240, and a charging circuit 220 and a control circuit 230 disposed between the charging interface 210 and the battery 240. Different from FIG. 1, the electronic device 200 supports charging in the low voltage charging mode. Accordingly, the charging circuit 220 includes a MOSFET transistor 3 (MOSFET-3) and a capacitor, in which the MOSFET-3 is always turned on during the charging.

The electronic device in FIG. 1 can only support the high voltage charging mode, and the electronic device in FIG. 2 can only support the low voltage charging mode. Therefore, the electronic device can be charged only when it is coupled with a power adapter matched with the charging mode which it supports, thus limiting the charging scene of the electronic device and degrading the user experience.

SUMMARY

Embodiments of the present disclosure provide a charge control method and device and an electronic device, which may not only support charging in a high voltage charging mode but also support charging in a low voltage charging mode.

In a first aspect, embodiments of the present disclosure provide a charge control method. The method is applied in an electronic device, the electronic device includes a charging interface, a charging circuit and a battery coupled in series, and the method includes: when a charging device is coupled with the charging interface, determining, by a charge control device, a charging mode supported by the charging device as a high voltage charging mode or a low voltage charging mode, in which a charging voltage of the high voltage charging mode is greater than a charging voltage of the low voltage charging mode; and controlling the charging circuit by the charge control device according to the charging mode supported by the charging device, such that the charging circuit charges the battery in the charging mode supported by the charging device.

In a second aspect, a charge control device is provided. The device is applied in an electronic device, the electronic device includes a charging interface, a charging circuit and a battery coupled in series, and the device includes: a determining component, configured to determine a charging mode supported by a charging device as a high voltage charging mode or a low voltage charging mode when the charging device is coupled with the charging interface, in which a charging voltage of the high voltage charging mode is greater than a charging voltage of the low voltage charging mode; a controller, configured to control the charging circuit according to the charging mode supported by the charging device and determined by the determining component, such that the charging circuit charges the battery in the charging mode supported by the charging device.

In a third aspect, a processor is provided. The processor is applied in an electronic device, and the electronic device includes a charging interface, a charging circuit and a battery coupled in series. The processor is configured to: determine a charging mode supported by a charging device as a high voltage charging mode or a low voltage charging mode when the charging device is coupled with the charging interface, in which a charging voltage of the high voltage charging mode is greater than a charging voltage of the low voltage charging mode; and control the charging circuit according to the charging mode supported by the charging device, such that the charging circuit charges the battery in the charging mode supported by the charging device.

In a fourth aspect, a computer readable medium is provided. The computer readable medium is configured to store programs that when executed by a processor, cause the processor to perform a method according to the first aspect or any possible implementation of the first aspect.

In a fifth aspect, an electronic device is provided. The electronic device includes a charging interface, a charging circuit and a battery coupled in series, and the electronic device further includes the charge control device according to the second aspect or any possible implementation of the second aspect.

In a sixth aspect, embodiments of the present disclosure provide an electronic device. The electronic device includes a charging interface, a charging circuit and a battery coupled in series, and the electronic device further includes a controller coupled with the charging circuit, and the controller is configured to: determine a charging mode supported by a charging device as a high voltage charging mode or a low voltage charging mode when the charging device is coupled with the charging interface, in which a charging voltage of the high voltage charging mode is greater than a charging voltage of the low voltage charging mode; and control the charging circuit according to the charging mode supported by the charging device, such that the charging circuit charges the battery in the charging mode supported by the charging device.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 3:
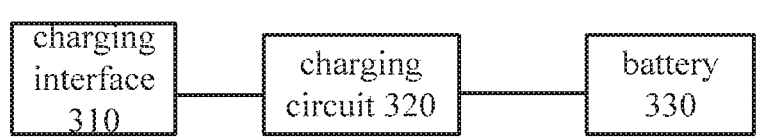
FIG. 3 is a schematic circuit diagram of an electronic device according to an embodiment of the present disclosure.

FIG. 3 is a schematic circuit diagram of an electronic device 300 according to an embodiment of the present disclosure. The electronic device 300 includes a charging interface 310, a charging circuit 320 and a battery 330. The charging interface 310 can be coupled with a charging device. The charging device may be any device which can charge the electronic device via the charging interface 310, such as a power adapter, a charge pal, a portable power source, and a personal computer, and the present disclosure is not limited thereto. The charging circuit 320 can be configured to receive the charging current transmitted by the charging device via the charging interface 310 and to charge the battery 330 according to the charging current. The battery 330 can be a lithium battery or any other type of battery, which is not limited in embodiments of the present disclosure.

In an embodiment of the present disclosure, the charging interface 310 can be a USB (Universal Serial Bus) interface, for example, a common USB interface or a micro USB interface, which is not limited in embodiments of the present disclosure. The charging interface 310 can include a power line and a data line. The power line of the charging interface 310 can be a VBus line and/or a ground line in the USB interface, and can be configured to charge the electronic device. The data line of the charging interface 310 can be a D+ line and/or a D− line in the USB interface, and can be configured to perform bidirectional communication between the electronic device and the charging device. The bidirectional communication can refer to an information interaction between the electronic device and the charging device, but the embodiments of the present disclosure are not limited thereto.

In an embodiment of the present disclosure, from the perspective of the charging current, the electronic device can support a common charging mode and a quick charging mode, in which the charging current of the quick charging mode is greater than the charging current of the common charging mode, for example, the charging current of the common charging mode is generally less than 2.5 A, and the charging current of the quick charging mode can be greater than 3 A, but the embodiments of the present disclosure are not limited thereto.

In an embodiment of the present disclosure, from the perspective of the charging voltage, the electronic device can support a high voltage charging mode and a low voltage charging mode, in which the charging voltage of the high voltage charging mode is greater than the charging voltage of the low voltage charging mode. In an embodiment of the present disclosure, the charging voltage of the high voltage charging mode can be greater than a standard voltage (5V), and the charging voltage of the low voltage charging mode can be less than the standard voltage, but embodiments of the present disclosure are not limited thereto. In addition, the charging current of the high voltage charging mode and the low voltage charging mode is not limited in embodiments of the present disclosure. The high voltage charging mode can be a high-voltage quick charging mode, and can also be a high-voltage common charging mode. The low voltage charging mode can be a low-voltage quick charging mode, and can also be a low-voltage common charging mode.

Figure 4:
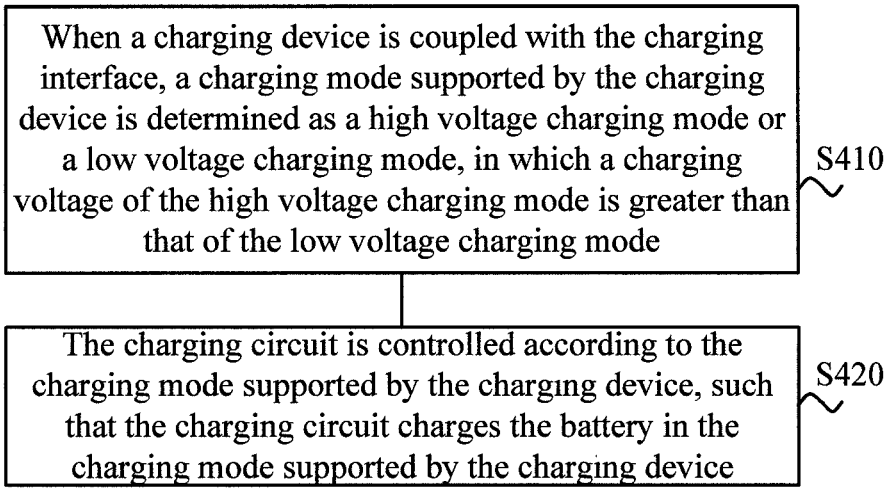
FIG. 4 is a flow chart of a charge control method according to an embodiment of the present disclosure.

FIG. 4 is a flow chart of a charge control method 400 according to an embodiment of the present disclosure. The method 400 can be applied in an electronic device. The electronic device can be the electronic device 300 illustrated in FIG. 3, but embodiments of the present disclosure are not limited thereto. In an embodiment of the present disclosure, the method 400 can be executed by one or more components in the electronic device, for example, the method 400 can be executed by a processor or a control circuit or a controller in the electronic device. For convenience of description, description is made hereinafter by taking a case in which the charge control method 400 is executed by a charge control device as an example, in which the charge control device can be disposed in the electronic device, for example, the electronic device can include a control circuit, and the control circuit includes the charge control device, but embodiments of the present disclosure are not limited thereto. As illustrated in FIG. 4, the method 400 includes following acts.

At block S410, when a charging device is coupled with the charging interface, a charging mode supported by the charging device is determined as the high voltage charging mode or the low voltage charging mode, in which the charging voltage of the high voltage charging mode is greater than the charging voltage of the low voltage charging mode.

At block S420, the charging circuit is controlled according to the charging mode supported by the charging device, such that the charging circuit charges the battery in the charging mode supported by the charging device.

Thus, with the charge control method according to embodiments of the present disclosure, by determining the charging mode supported by the charging device coupled with the electronic device as the high voltage charging mode or the low voltage charging mode, and controlling the charging circuit of the electronic device according to the charging mode supported by the charging device, the charging circuit can work in the charging mode supported by the charging device, such that both the charging in the high voltage charging mode and the charging in the low voltage charging mode can be supported, thereby being suitable for various scenes of different charging devices, and improving user experience.

In an embodiment of the present disclosure, the charge control device can further detect whether the charging interface is coupled with the charging device, and determine the charging mode supported by the charging device when determining that the charging interface is coupled with the charging device, but embodiments of the present disclosure are not limited thereto. In an embodiment of the present disclosure, the charge control device can determine the charging mode supported by the charging device as the high voltage charging mode or the low voltage charging mode, for example, determine the charging mode supported by the charging device as the high-voltage quick charging mode or the low-voltage quick charging mode, but embodiments of the present disclosure are not limited thereto.

In an embodiment of the present disclosure, the charge control device can determine the charging mode supported by the charging device in many ways. As an alternative embodiment, the charge control device can communicate with the charging device via the data line of the charging interface, so as to determine the charging mode supported by the charging device. In this case, at block S410, determining the charging mode supported by the charging device as the high voltage charging mode or the low voltage charging mode includes:

receiving, via the data line of the charging interface, indication information sent by the charging device, in which the indication information is configured to indicate the charging mode supported by the charging device; and determining the charging mode supported by the charging device as the high voltage charging mode or the low voltage charging mode according to the indication information.

In an embodiment of the present disclosure, the indication information can include information on protocol version supported by the charging device (protocol version information). In this case, the charge control device can determine the charging mode supported by the charging device as the high voltage charging mode or the low voltage charging mode according to the protocol version information. Or, the indication information can also include any other information which can be used by the charge control device for determining the charging mode supported by the charging device, which is not limited in embodiments of the present disclosure. In an embodiment of the present disclosure, after the charging device is coupled with the data line of the charging interface, the charging device can actively send the indication information to the charge control device via the data line of the charging interface. Or, the charge control device sends second indication information to the charging device via the data line of the charging interface when the charge control device detects that the charging device is coupled with the charging interface, in which the second indication information is configured to query the charging mode supported by the charging device. Accordingly, the charging device sends the indication information to the charge control device via the data line of the charging interface according to the second indication information after receiving the second indication information sent by the charge control device. However, the present disclosure is not limited thereto. In an embodiment of the present disclosure, the data line of the charging interface can be a D+ line and/or a D− line of the USB interface, which is not limited in embodiments of the present disclosure.

Figure 5:
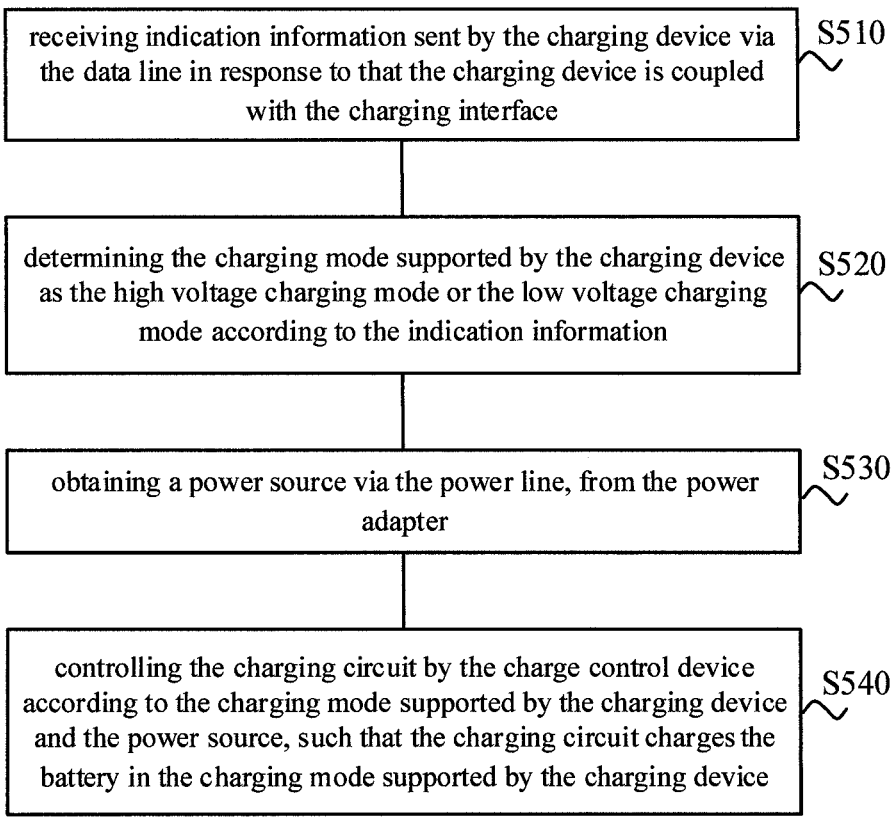
FIG. 5 is a flow chart of a charge control method 500 according to an embodiment of the present disclosure.

FIG. 5 is a flow chart of a charge control method 500 according to an embodiment of the present disclosure. This embodiment is based on the embodiment illustrated in FIG. 4, and thus the same parts are not repeated herein. As illustrated in FIG. 5, the method 500 includes following acts.

At block S510, indication information sent by the charging device is received via the data line in response to that the charging device is coupled with the charging interface.

At block S520, the charging mode supported by the charging device is determined as the high voltage charging mode or the low voltage charging mode according to the indication information.

At block S530, a power source is obtained via the power line, from the power adapter.

At block S540, the charging circuit is controlled by the charge control device according to the charging mode supported by the charging device and the power source, such that the charging circuit charges the battery in the charging mode supported by the charging device.

Figure 6:
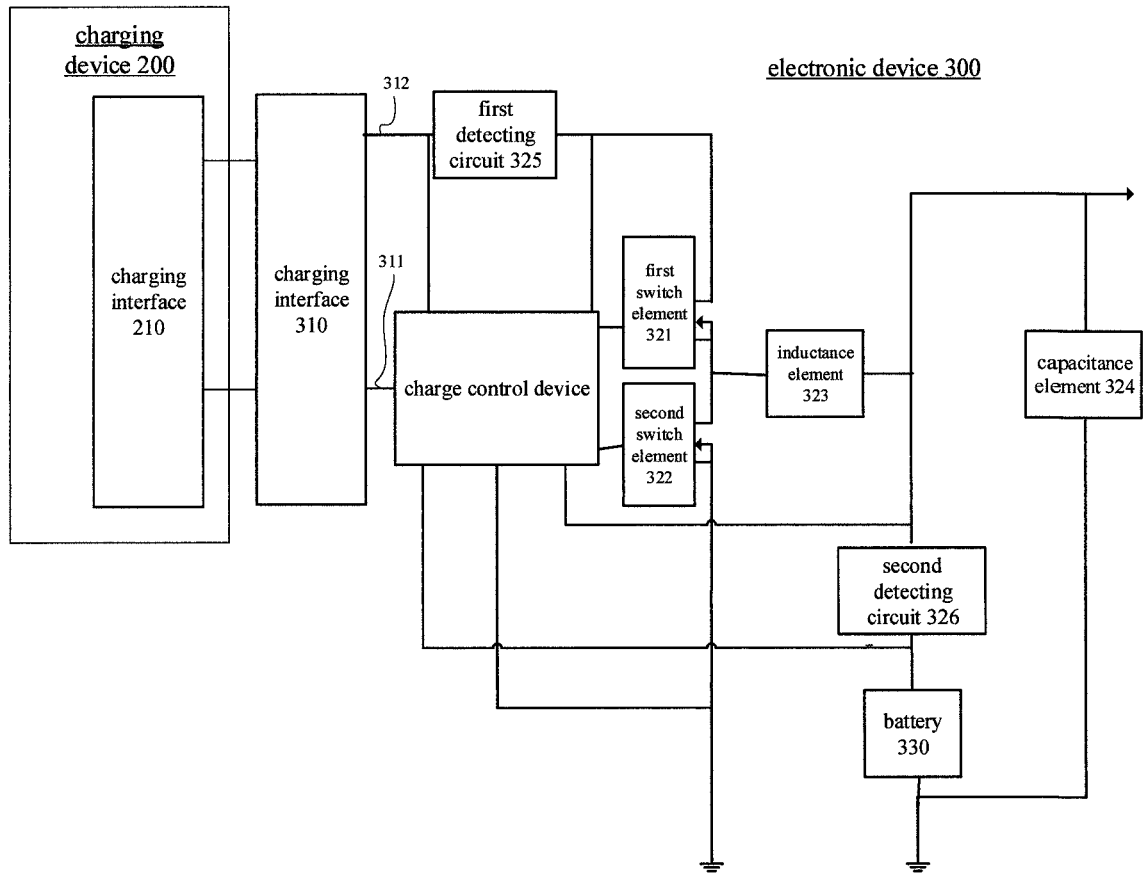
FIG. 6 is a schematic circuit diagram of an electronic device according to another embodiment of the present disclosure.

In an embodiment of the present disclosure, the charge control device can control the working mode of the charging circuit, such that the charging circuit works in the charging mode supported by the charging device. As an alternative embodiment of the present disclosure, as illustrated in FIG. 6, the charging device 200 may be coupled to the electronic device 300 via the charging interface 210 of the charging device 200 and the charging interface 310 of the electronic device 300. The charging interface 310 include the data line 311 and the power line 312. As an alternative embodiment of the present disclosure, as illustrated in FIG. 6, the charging circuit 320 can include a first switch element 321 and a second switch element 322. A first end of the charge control device can be coupled with a grid of the first switch element 321, a second end of the charge control device can be coupled with a grid of the second switch element 322, that is, the first end of the charge control device can be coupled with the grid of first switch element 321 directly or via other elements, and the second end of the charge control device can be coupled with the grid of the second switch element 322 directly or via other elements. FIG. 6 schematically illustrates that the first end of the charge control device is coupled with the grid of the first switch element 321 directly and the second end of the charge control device is coupled with the grid of the second switch element 322 directly, but the present disclosure is not limited thereto. A source of the first switch element 321 can be coupled with a drain of the second switch element 322, a drain of the first switch element 321 can be coupled with the power line of the charging interface 310 directly or indirectly, and a source of the second switch element 322 can be grounded. In this case, the charge control device can control the charging circuit by controlling the first switch element and the second switch element, but the present disclosure is not limited thereto.

In an embodiment of the present disclosure, the first switch element and/or the second switch element can be a MOSFET transistor, a relay or a triode, which is not limited in embodiments of the present disclosure.

As an alternative embodiment, at block S420, controlling the charging circuit according to the charging mode supported by the charging device such that the charging circuit charges the battery in the charging mode supported by the charging device, includes:

if the charging mode supported by the charging device is the low voltage charging mode, controlling the first switch element to switch on, and controlling the second switch element to switch off.

In detail, the charge control device can control the first switch element to be always turned on during the charging, and control the second switch element to be always turned off during the charging, such that the charging current provided by the charging device is transmitted to the battery via the first switch element of the charging circuit. In this case, the charging circuit can be in the bypass mode, which is not limited in the present disclosure.

As another alternative embodiment, at block S420, controlling the charging circuit according to the charging mode supported by the charging device such that the charging circuit charges the battery in the charging mode supported by the charging device, includes:

if the charging mode supported by the charging device is the high voltage charging mode, controlling the first switch element and the second switch element to switch on alternately.

In detail, the charge control device can control the first switch element to be in a switch-on state and in a switch-off state alternately during the charging, and control the second switch element to be also in the switch-on state and in the switch-off state alternately during the charging, in which, at a same time point, one of the first switch element and the second switch element is in the switch-on state, and the other one is in the switch-off state, such that the first switch element and the second switch element are in the switch-on state alternately. For example, the charge control device can control the first switch element to be in the switch-on state within a first time period, and control the second switch element to be in the switch-off state within the first time period; control the first switch element to be in the switch-off state within a second time period, and control the second switch element to be in the switch-on state within the second time period, in which the second time period can be immediately after the first time period. In this case, the charging circuit can be in the buck mode, which is not limited in the present disclosure.

As another alternative embodiment, the charging circuit 320 can further include an inductance element 323 and a capacitance element 324. A first end of the inductance element 323 can be coupled with the source of the first switch element and the drain of the second switch element respectively. A second end of the inductance element 323 can be coupled with a first end of the capacitance element 324 and a first end of the battery 330 respectively. A second end of the capacitance element 324 is coupled with a second end of the battery 330 and is grounded. FIG. 6 schematically illustrates that the first end of the inductance element 323 is coupled with the source of the first switch element 321 and the drain of the second switch element 322 directly. The second end of the inductance element 323 is coupled with the first end of the capacitance element 324 and the first end of the battery 330 directly, but the present disclosure is not limited thereto.

In an embodiment of the present disclosure, the capacitance element can be a capacitor configured with a PCB (Printed Circuit Board) or a capacitor configured with a FPC (Flexible Printed Circuit).

In detail, the capacitor configured with the PCB can be a capacitor configured specially using a PCB and a copper foil thereon, and the capacitor configured with the FPC can be a capacitor designed specially using the FPC. The capacitor configured with the PCB and the capacitor configured with the FPC mainly have advantages in that they can be designed as any shape, any size, and any thickness, and can be designed randomly according to the structure and shape of the electronic device such as the mobile phone.

In an embodiment of the present disclosure, the size, shape or thickness of the capacitor in the capacity coupler is designed based on the structure of the electronic device.

In this case, when the first switch element 321 is in the switch-on state and the second switch element 322 is in the switch-off state, the capacitance element 324 and the inductance element 323 store energy. In detail, the first switch element 321 can receive the charging current transmitted by the charging device via the power line of the charging interface 310, and transmit the received charging current to the inductance element 323, and the inductance element 323 can transmit the received charging current to the capacitance element 324 and the battery 330 respectively, such that the battery 330 is charged. When the first switch element 321 is in the switch-off state and the second switch element 322 is in the switch-on state, the inductance element 323 and the capacitance element 324 release energy. In detail, the inductance element 323 transmits current to the capacitance element 324 and the battery 330 respectively, and the capacitance element 324 transmits current to the battery 330, and transmits current to the second switch element 322 via the ground, which is not limited in the present disclosure.

As another alternative embodiment, the charge control device can control the charging current and voltage during the charging. For example, when the charging device supports the high voltage charging mode, the charge control device can detect the voltage and/or current of the charging circuit, and control the current and/or voltage of the charging circuit according to the detection result. In an embodiment of the present disclosure, as illustrated in FIG. 6, the charging circuit 320 further includes a first detecting circuit 325 and a second detecting circuit 326. The drain of the first switch element 321 is coupled with the power line of the charging interface 310 via the first detecting circuit 325, and two ends of the first detecting circuit 325 are coupled with a third end and a fourth end of the charge control device respectively. The second end of the inductance element is coupled with the first end of the battery via the second detecting circuit, and two ends of the second detecting circuit 326 are coupled with a fifth end and a sixth end of the charge control device respectively. In this case, a seventh end of the charge control device can be grounded, and the first detecting circuit 325 and/or the second detecting circuit 326 can include a current detecting resistor with a small resistance and/or other elements, which is not limited in the present disclosure.

In this case, at block S420, controlling the charging circuit according to the charging mode supported by the charging device such that the charging circuit charges the battery in the charging mode supported by the charging device, includes:

if the charging device supports the high voltage charging mode, determining a charging parameter input by the power line of the charging interface by using the first detecting circuit, and determining a charging parameter of the battery by using the second detecting circuit, in which the charging parameter includes at least one of the current and the voltage; and controlling the charging circuit according to the charging parameter input by the power line of the charging interface and the charging parameter of the battery, such that the charging circuit charges the battery in the charging mode supported by the charging device.

The charge control device can determine the voltage $V_{BUS}$ and/or the current $I_{BUS}$ input by the power line of the charging interface by detecting the voltage across the first detecting circuit, and can determine the voltage $V_{BAT}$ and/or the current $I_{BAT}$ of the battery by detecting the voltage across the second detecting circuit. The charge control device can control the charging circuit according to at least one of $V_{BUS}$, $I_{BUS}$, $V_{BAT}$ and $I_{BAT}$, such that charging the battery in the high voltage charging mode is realized. In detail, the charge control device can control the switch-on duration of the first switch element and the switch-on duration of the second switch element, for example, control the switch frequency and duty ratio of each of the first switch element and the second switch element, in which the switch frequency is used to represent the number of state switching cycles included in an unit time, and the duty ratio is used to represent a ratio of the duration in which the switch element is in the switch-on state to one state switching cycle. The present disclosure is not limited thereto.

As another alternative embodiment, when the charging device supports the low voltage charging mode, the charging device can control the charging current and/or voltage, so as to ensure that the charging current is constant; or the charge control device can communicate with the charging device and control the voltage and current during the charging, which is not limited in the present disclosure.

As another alternative embodiment, controlling the charging circuit by the charge control device according to the charging parameter input by the power line of the charging interface and the charging parameter of the battery such that the charging circuit charges the battery in the charging mode supported by the charging device, includes:

determining by the charge control device whether the charging is abnormal or whether the battery is fully charged according to at least one of $V_{BUS}$, $I_{BUS}$, $V_{BAT}$ and $I_{BAT}$; and if it is determined that the charging is abnormal or the battery is fully charged, controlling the first switch element and the second switch element to be in the switch-off state, such that the charging process is terminated.

For example, when the charging device supports the low voltage charging mode, the charge control device can control the first switch element to switch to the switch-off state from the switch-on state, such that the charging device stops charging the battery, while the present disclosure is not limited thereto.

It can be understood that, serial numbers of the above processes do not mean an execution order, and the execution order of respective processes is determined according to the functions and internal logic thereof, which shall not be constructed to limit the implementation of embodiments of the present disclosure.

Figure 7:
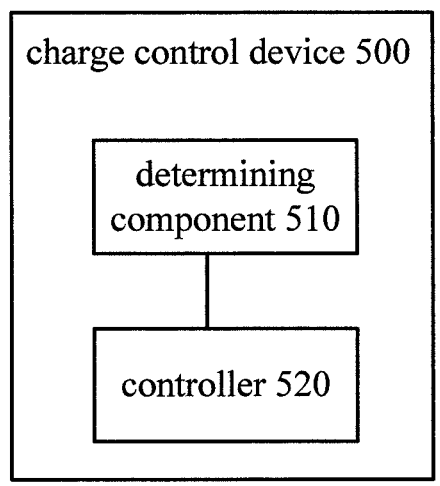
FIG. 7 is a block diagram of a charge control device according to an embodiment of the present disclosure.

FIG. 7 illustrates a charge control device 500 according to an embodiment of the present disclosure. The device 500 can be applied in an electronic device including a charging interface, a charging circuit and a battery coupled in series, in which the charging interface can be a USB interface, which is not limited in the present disclosure. In detail, the device 500 can be applied in the electronic device, which is not limited in the present disclosure. As illustrated in FIG. 7, the device 500 includes a determining component 510 and a controller 520.

The determining component 510 is configured to determine a charging mode supported by a charging device as a high voltage charging mode or a low voltage charging mode when the charging device is coupled with the charging interface, in which a charging voltage of the high voltage charging mode is greater than a charging voltage of the low voltage charging mode.

The controller 520 is configured to control the charging circuit according to the charging mode supported by the charging device and determined by the determining component 510, such that the charging circuit charges the battery in the charging mode supported by the charging device.

In an embodiment of the present disclosure, the determining component 510 can further detect whether the charging interface is coupled with the charging device, and determine the charging mode supported by the charging device when determining that the charging interface is coupled with the charging device, while the present disclosure is not limited thereto. In an embodiment of the present disclosure, the determining component 510 can determine the charging mode supported by the charging device as the high voltage charging mode or the low voltage charging mode, for example, determine the charging mode supported by the charging device as the high-voltage quick charging mode or the low-voltage quick charging mode, which is not limited in the present disclosure.

In an embodiment of the present disclosure, the charge control device can be coupled with the charging circuit, for controlling the charging circuit. As an alternative embodiment, the charging circuit can include a first switch element and a second switch element. In this case, a first end of the charge control device can be coupled with a grid of the first switch element, a second end of the charge control device can be coupled with a grid of the second switch element, a source of the first switch element can be coupled with a drain of the second switch element, a drain of the first switch element can be coupled with a power line of the charging interface directly or indirectly, and a source of the second switch element can be grounded. The device can be coupled with the charging circuit in other ways, which is not limited in the present disclosure.

In an embodiment of the present disclosure, the first switch element is a first MOSFET transistor, and the second switch element is a second MOSFET transistor. Or, the first switch element and/or the second switch element can be a triode or a relay, which is not limited in the present disclosure.

As another alternative embodiment, the charging circuit further includes an inductance element and a capacitance element. A first end of the inductance element is coupled with the source of the first switch element and the drain of the second switch element respectively. A second end of the inductance element is coupled with a first end of the capacitance element and a first end of the battery respectively. A second end of the capacitance element is coupled with a second end of the battery and grounded.

As an alternative embodiment, the controller 520 is configured to control the first switch element to switch on and control the second switch element to switch off, if the determining component 510 determines that the charging mode supported by the charging device is the low voltage charging mode.

In this case, the controller 520 can be configured to control the first switch element to be always switched on during the charging, and to control the second switch element to be always switched off during the charging, such that the charging current provided by the charging device is transmitted to the battery via the first switch element of the charging circuit. In this case, the charging circuit may be in the bypass mode, which is not limited in the present disclosure.

As another alternative embodiment, the controller 520 is configured to control the first switch element and the second switch element to switch on alternately, if the determining component 510 determines that the charging mode supported by the charging device is the high voltage charging mode.

In this case, the controller 520 can control the first switch element to be in a switch-on state and in a switch-off state alternately during the charging, and control the second switch element to be also in the switch-on state and in the switch-off state alternately during the charging, in which, at a same time point, one of the first switch element and the second switch element is in the switch-on state, and the other one is in the switch-off state, such that the first switch element and the second switch element are in the switch-on state alternately. In this case, the charging circuit can be in the buck mode, which is not limited in the present disclosure.

As another alternative embodiment, the device 500 can further be coupled with a data line of the charging interface, in which the data line of the charging interface is configured to perform communication between the electronic device and the charging device. In this case, in an embodiment of the present disclosure, the determining component 510 includes a receiver and a determining part. The receiver is configured to receive, via the data line of the charging interface, indication information sent by the charging device, in which the indication information is configured to indicate the charging mode supported by the charging device. The determining part is configured to determine the charging mode supported by the charging device as the high voltage charging mode or the low voltage charging mode according to the indication information received by the receiver.

The determining component 510 can further determine the charging mode supported by the charging device in other ways, which is not limited in the present disclosure.

As another alternative embodiment, the charging circuit further includes a first detecting circuit and a second detecting circuit. The drain of the first switch element is coupled with the power line of the charging interface via the first detecting circuit, and two ends of the first detecting circuit are coupled with a third end and a fourth end of the charge control device respectively. Two ends of the second detecting circuit are coupled with a fifth end and a sixth end of the charge control device respectively.

In an embodiment of the present disclosure, the first detecting circuit and/or the second detecting circuit can include a current detecting resistor with a small resistance and/or other elements, which is not limited in the present disclosure.

In this case, if the determining component 510 determines that the charging device supports the high voltage charging mode, the controller 520 can be further configured to: determine via the first detecting circuit, a charging parameter input by the power line of the charging interface, and determine via the second detecting circuit, a charging parameter of the battery, in which the charging parameter can include at least one of the current and the voltage; and control the charging circuit according to the charging parameter input by the power line of the charging interface and the charging parameter of the battery, such that the charging circuit charges the battery in the charging mode supported by the charging device.

In an embodiment of the present disclosure, the controller 520 can be configured to: determine whether the charging is abnormal or whether the battery is fully charged according to the charging parameter input by the power line of the charging interface and the charging parameter of the battery; if it is determined that the charging is abnormal or the battery is fully charged, control the first switch element and the second switch element to switch off, such that the charging process is terminated.

Thus, with the charge control device provided by embodiments of the present disclosure, by determining the charging mode supported by the charging device coupled with the electronic device as the high voltage charging mode or the low voltage charging mode, and controlling the charging circuit of the electronic device according to the charging mode supported by the charging device, the charging circuit can work in the charging mode supported by the charging device, such that both the charging in the high voltage charging mode and the charging in the low voltage charging mode can be supported, thereby being suitable for various scenes of different charging devices, and improving user experience.

Embodiments of the present disclosure further provide a processor. The processor can be applied in an electronic device including a charging interface, a charging circuit and a battery coupled in series, in which the charging interface can be a USB interface, which is not limited in the present disclosure. In detail, the processor can be applied in the electronic device, which is not limited in the present disclosure.

The processor is configured to: determine a charging mode supported by a charging device as a high voltage charging mode or a low voltage charging mode when the charging device is coupled to the charging interface, in which a charging voltage of the high voltage charging mode is greater than a charging voltage of the low voltage charging mode;

control the charging circuit according to the charging mode supported by the charging device, such that the charging circuit charges the battery in the charging mode supported by the charging device.

In an embodiment of the present disclosure, the processor can further detect whether the charging interface is coupled with the charging device, and determine the charging mode supported by the charging device when determining that the charging interface is coupled with the charging device, while the present disclosure is not limited thereto. In an embodiment of the present disclosure, the processor can determine the charging mode supported by the charging device as the high voltage charging mode or the low voltage charging mode, for example, determine the charging mode supported by the charging device as the high-voltage quick charging mode or the low-voltage quick charging mode, which is not limited in the present disclosure.

In an embodiment of the present disclosure, the processor can be coupled with the charging circuit, for controlling the charging circuit. As an alternative embodiment, the charging circuit can include a first switch element and a second switch element. In this case, a first end of the processor can be coupled with a grid of the first switch element, a second end of the processor can be coupled with a grid of the second switch element, a source of the first switch element can be coupled with a drain of the second switch element, a drain of the first switch element can be coupled with a power line of the charging interface directly or indirectly, and a source of the second switch element can be grounded. The processor can be coupled with the charging circuit in other ways, which is not limited in the present disclosure.

In an embodiment of the present disclosure, the first switch element is a first MOSFET transistor, and the second switch element is a second MOSFET transistor. Or, the first switch element and/or the second switch element can be a triode or a relay, which is not limited in the present disclosure.

As another alternative embodiment, the charging circuit further includes an inductance element and a capacitance element. A first end of the inductance element is coupled with the source of the first switch element and the drain of the second switch element respectively. A second end of the inductance element is coupled with a first end of the capacitance element and a first end of the battery respectively. A second end of the capacitance element is coupled with a second end of the battery and grounded.

As an alternative embodiment, the processor is configured to control the first switch element to switch on and control the second switch element to switch off, if the charging mode supported by the charging device is the low voltage charging mode.

In this case, the processor can be configured to control the first switch element to be always switched on during the charging, and to control the second switch element to be always switched off during the charging, such that the charging current provided by the charging device is transmitted to the battery via the first switch element of the charging circuit. In this case, the charging circuit can be in the bypass mode, which is not limited in the present disclosure.

As another alternative embodiment, the processor is configured to control the first switch element and the second switch element to switch on alternately, if the charging mode supported by the charging device is the high voltage charging mode.

In this case, the processor can control the first switch element to be in a switch-on state and in a switch-off state alternately during the charging, and control the second switch element to be also in the switch-on state and in the switch-off state alternately during the charging, in which, at a same time point, one of the first switch element and the second switch element is in the switch-on state, and the other one is in the switch-off state, such that the first switch element and the second switch element are in the switch-on state alternately. In this case, the charging circuit can be in the buck mode, which is not limited in the present disclosure.

As another alternative embodiment, the processor can further be coupled with a data line of the charging interface, in which the data line of the charging interface is configured to perform communication between the electronic device and the charging device. In this case, in an embodiment of the present disclosure, the processor is configured to: receive via the data line of the charging interface indication information sent by the charging device, in which the indication information is configured to indicate the charging mode supported by the charging device; determine the charging mode supported by the charging device as the high voltage charging mode or the low voltage charging mode according to the indication information.

The processor can also determine the charging mode supported by the charging device in other ways, which is not limited in the present disclosure.

As another alternative embodiment, the charging circuit further includes a first detecting circuit and a second detecting circuit. The drain of the first switch element is coupled with the power line of the charging interface via the first detecting circuit, and two ends of the first detecting circuit are coupled with a third end and a fourth end of the processor respectively. Two ends of the second detecting circuit are coupled with a fifth end and a sixth end of the processor respectively.

In an embodiment of the present disclosure, the first detecting circuit and/or the second detecting circuit can include a current detecting resistor with a small resistance and/or other elements, which is not limited in the present disclosure.

In this case, if the charging device supports the high voltage charging mode, the processor can be further configured to: determine via the first detecting circuit, a charging parameter input by the power line of the charging interface, and determine via the second detecting circuit, a charging parameter of the battery, in which the charging parameter can include at least one of the current and the voltage; and control the charging circuit according to the charging parameter input by the power line of the charging interface and the charging parameter of the battery, such that the charging circuit charges the battery in the charging mode supported by the charging device.

In an embodiment of the present disclosure, the processor can be configured to: determine whether the charging is abnormal or whether the battery is fully charged according to the charging parameter input by the power line of the charging interface and the charging parameter of the battery; if it is determined that the charging is abnormal or the battery is fully charged, control the first switch element and the second switch element to switch off, such that the charging device stops charging the battery.

Thus, with the processor provided by embodiments of the present disclosure, by determining the charging mode supported by the charging device coupled with the electronic device as the high voltage charging mode or the low voltage charging mode, and controlling the charging circuit of the electronic device according to the charging mode supported by the charging device, the charging circuit can work in the charging mode supported by the charging device, such that both the charging in the high voltage charging mode and the charging in the low voltage charging mode can be supported, thereby being suitable for various scenes of different charging devices, and improving user experience.

Embodiments of the present disclosure further provide a computer readable storage medium configured to store programs and/or at least one instruction executable by the processor in the above embodiment. When the processor executes the programs and/or at least one instruction, it execute respective processes and/or steps described above, for example, the processor can be the processor described above, which is not limited in the present disclosure.

Embodiments of the present disclosure further provide an electronic device. The electronic device can include a memory and a processor, in which the memory is configured to store programs and/or at least one instruction, and the processor can be configured to execute the programs and/or at least one instruction stored in the memory, so as to execute respective processes and/or steps described above, which is not limited in the present disclosure.

Figure 8:
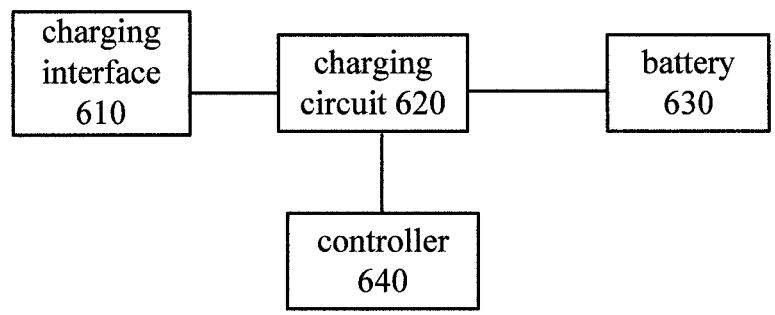
FIG. 8 is a block diagram of an electronic device according to an embodiment of the present disclosure.

FIG. 8 illustrates another electronic device 600 provided by embodiments of the present disclosure. The electronic device 600 includes a charging interface 610, a charging circuit 620 and a battery 630 coupled in series, and the electronic device 600 further includes a controller 640 coupled with the charging circuit 620. The controller 640 is configured to: determine a charging mode supported by a charging device as a high voltage charging mode or a low voltage charging mode when the charging device is coupled with the charging interface 610, in which a charging voltage of the high voltage charging mode is greater than the charging voltage of the low voltage charging mode; control the charging circuit 620 according to the charging mode supported by the charging device, such that the charging circuit 620 charges the battery 630 in the charging mode supported by the charging device.

In an embodiment of the present disclosure, the controller 640 can be the charge control device 500 or the processor described above, which is not limited in the present disclosure.

As an alternative embodiment, the electronic device 600 can include a control circuit, and the controller 640 can be located in the control circuit. In an embodiment of the present disclosure, the control circuit can further include other elements, which is not limited in the present disclosure.

Figure 9:
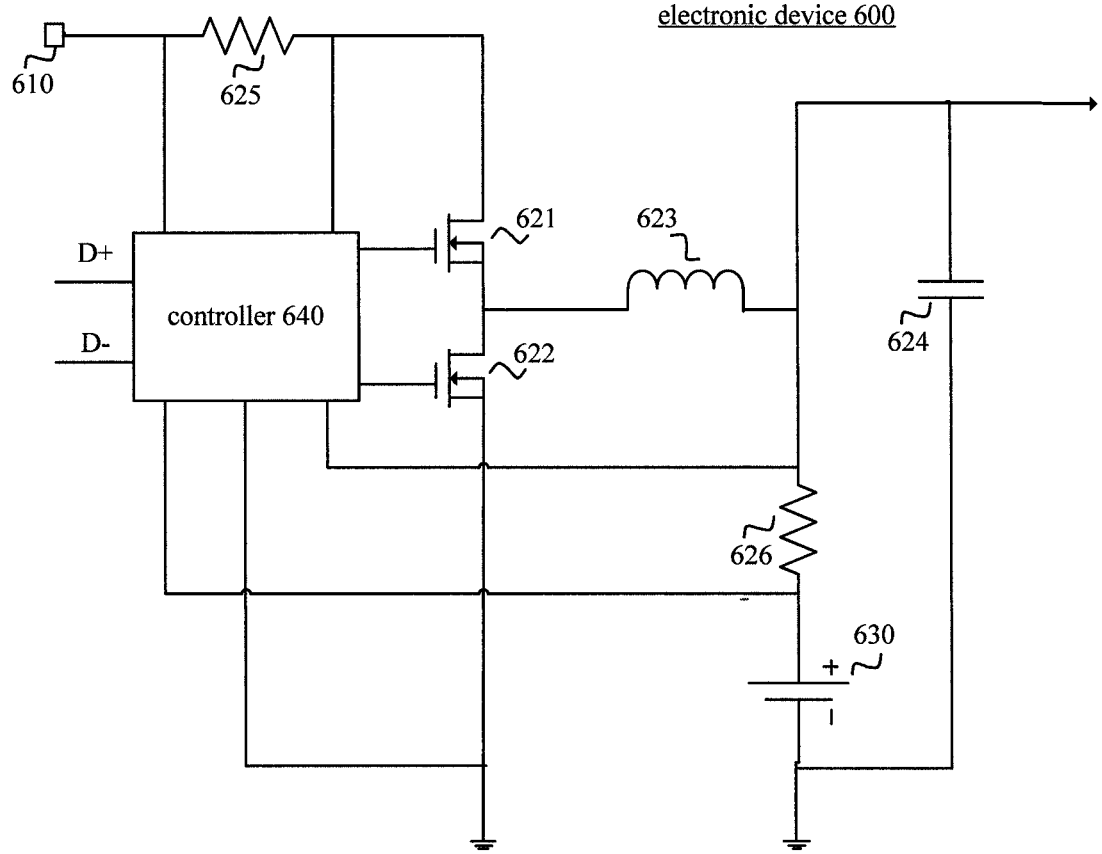
FIG. 9 is a block diagram of an electronic device according to another embodiment of the present disclosure.

As another alternative embodiment, as illustrated in FIG. 9, the charging circuit 620 includes a first switch element 621 and a second switch element 622. In this case, a first end of the controller 640 can be coupled with a grid of the first switch element 621, a second end of the controller 640 can be coupled with a grid of the second switch element 622. A source of the first switch element 621 can be coupled with a drain of the second switch element 622, a drain of the first switch element 621 can be coupled with the power line of the charging interface 610 directly or indirectly. A source of the second switch element 622 can be grounded. The controller 640 can also be coupled with the charging circuit 620 in other ways, which is not limited in the present disclosure.

In an embodiment of the present disclosure, the first switch element 621 is a first MOSFET transistor, and the second switch element 622 is a second MOSFET transistor. Or, the first switch element 621 and/or the second switch element 622 can be a triode or a relay, which is not limited in the present disclosure.

As another alternative embodiment, the charging circuit 620 further includes an inductance element 623 and a capacitance element 624. A first end of the inductance element 623 is coupled with the source of the first switch element 621 and the drain of the second switch element 622 respectively. A second end of the inductance element 623 is coupled with a first end of the capacitance element 624 and a first end of the battery 630 respectively. A second end of the capacitance element 624 is coupled with a second end of the battery 630 and grounded.

In an embodiment of the present disclosure, the controller 640 is configured to control the first switch element 621 to switch on and control the second switch element 622 to switch off, if the charging mode supported by the charging device is the low voltage charging mode.

In this case, the controller 640 can be configured to control the first switch element 621 to be always switched on during the charging, and to control the second switch element 622 to be always switched off during the charging, such that the charging current provided by the charging device is transmitted to the battery 630 via the first switch element 621 of the charging circuit 620. In this case, the charging circuit 620 can be in the bypass mode, which is not limited in the present disclosure.

As another alternative embodiment, the controller 640 is configured to control the first switch element 621 and the second switch element 622 to switch on alternately, if the charging mode supported by the charging device is the high voltage charging mode.

In this case, the controller 640 can control the first switch element 621 to be in a switch-on state and in a switch-off state alternately during the charging, and control the second switch element 622 to be also in the switch-on state and in the switch-off state alternately during the charging, in which, at a same time point, one of the first switch element 621 and the second switch element 622 is in the switch-on state, and the other one is in the switch-off state, such that the first switch element 621 and the second switch element 622 are in the switch-on state alternately. In this case, the charging circuit 620 can be in the buck mode, which is not limited in the present disclosure.

As another alternative embodiment, the controller 640 can further be coupled with a data line of the charging interface 610, in which the data line of the charging interface 610 is configured to perform communication between the electronic device and the charging device. In this case, In an embodiment of the present disclosure, the controller 640 is configured to: receive indication information sent by the charging device via the data line of the charging interface 610, in which the indication information is configured to indicate the charging mode supported by the charging device; determine the charging mode supported by the charging device as the high voltage charging mode or the low voltage charging mode according to the indication information.

The controller 640 can also determine the charging mode supported by the charging device in other ways, which is not limited in the present disclosure.

As another alternative embodiment, the charging circuit 620 further includes a first detecting circuit 625 and a second detecting circuit 626. The drain of the first switch element 621 is coupled with the power line of the charging interface 610 via the first detecting circuit 625, and two ends of the first detecting circuit 625 are coupled with a third end and a fourth end of the controller respectively. Two ends of the second detecting circuit 626 are coupled with a fifth end and a sixth end of the controller respectively.

In an embodiment of the present disclosure, a seventh end of the controller 640 is grounded, the first detecting circuit 625 and/or the second detecting circuit 626 can include a current detecting resistor with a small resistance and/or other elements, in which FIG. 9 schematically illustrates that the first detecting circuit is a current detecting resistor and the second detecting circuit is a current detecting resistor, which is not limited in the present disclosure.

In this case, if the charging device supports the high voltage charging mode, the controller 640 can be further configured to: determine via the first detecting circuit 625, a charging parameter input by the power line of the charging interface 610, and determine via the second detecting circuit 626, a charging parameter of the battery 630, in which the charging parameter can include at least one of the current and the voltage; and control the charging circuit 620 according to the charging parameter input by the power line of the charging interface 610 and the charging parameter of the battery 630, such that the charging circuit 620 charges the battery 630 in the charging mode supported by the charging device.

In an embodiment of the present disclosure, the controller 640 can be configured to: determine whether the charging is abnormal or whether the battery 630 is fully charged according to the charging parameter input by the power line of the charging interface 610 and the charging parameter of the battery 630; if it is determined that the charging is abnormal or the battery 630 is fully charged, control the first switch element 621 and the second switch element 622 to switch off, such that the charging process is terminated.

Figure 1:
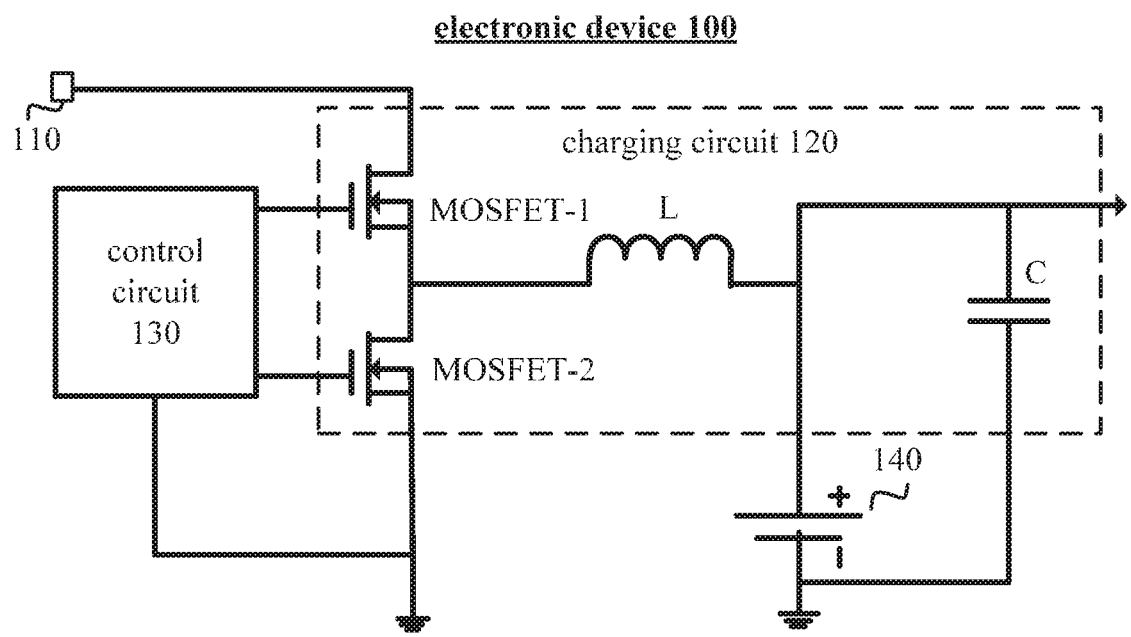
FIG. 1 is a schematic circuit diagram of an electronic device in the related art.
Figure 2:
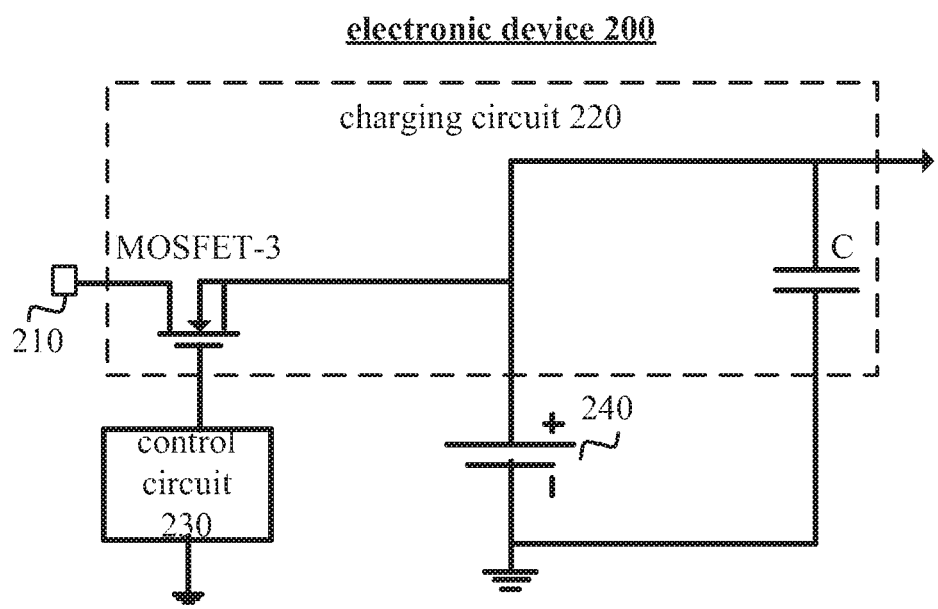
FIG. 2 is a schematic circuit diagram of another electronic device in the related art.

According to the charging method in the related art, if it is required to realize supporting both the high voltage charging mode and the low voltage charging mode, all the three switch elements of MOSFET-1 and MOSFET-2 in FIG. 1 and MOSFET-3 in FIG. 2 need to be included. However, in embodiments of the present disclosure, by controlling the first switch element and the second switch element in the charging circuit by the charge control device, the same charging circuit can not only charge the battery in the high voltage charging mode, but can also charge the battery in the low voltage charging mode, without the need of adding a third switch element and related circuit structure, which is simple in the circuit structure, and is simple to implement, thereby saving cost of the device.

It should be noted that, the example in FIG. 9 is merely used to facilitate those skilled in the art to understand embodiments of the present disclosure better, and is not used to limit the scope of the present disclosure. Obviously, those skilled in the art can make various equivalent modification or change according to the example in FIG. 9, and such modification or change fall within the scope of the present disclosure.

It can be understood that, in embodiments of the present disclosure, "A connected with B" may refer to that A is coupled to B, and may refer to that A is directly connected to B, or A is indirectly connected to B (i.e., A is connected with B via one or more intermediate elements), which is not limited in the present disclosure.

It can also be understood that, the electronic device can be any terminal device including a battery and capable of charging the battery via a charging interface, such as a mobile phone, a tablet personal computer, a media player, a smart TV, a laptop computer, a personal digital assistant, a mobile internet device, a wearable device like a smart watch, which is not limited in the present disclosure.

It can also be understood that, in embodiments of the present disclosure, the processor may be a CPU (Central Processing Unit), or any other general processor, DSP (Digital Signal Processor), ASIC (Application Specific Integrated Circuit), FPGA (Field Programmable Gate Array), or any other programmable logic element, separate gate, or transistor logic device or separate hardware component, etc. The general processor may be a microprocessor, or the processor may also be any conventional processor.

The memory may include a read-only memory and a random access memory, and provide instructions and data to the processor. A part of the memory may also include a non-transitory random access memory. For example, the memory may also store the information regarding the device type.

Those skilled in the art can be aware that, respective method steps and units described with reference to embodiments disclosed in the present disclosure can be realized by electronic hardware, computer software or a combination thereof. For clearly explaining the exchangeability of the software and hardware, steps and components of respective embodiments have been described generally according to functions in the above description. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units may refer to corresponding process in the above method embodiments, which will not be elaborated herein.

In several embodiments provided by the present disclosure, it should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A charge control method, applied in an electronic device, wherein the electronic device comprises a charging interface, a charging circuit and a battery coupled in series, the charging circuit comprises a first switch element and a second switch element which can be controlled to make the same charging circuit not only able to charge the battery in a high voltage charging mode but also able to charge the battery in a low voltage charging mode by only controlling the first switch element and the second switch element, the charging interface comprises a power line and a data line, the power line is configured to charge the electronic device, and the data line is configured to perform communication between the electronic device and a charging device, and the method comprises:

receiving, via the data line, indication information sent by the charging device in response to that the charging device is coupled with the charging interface, in which the indication information is configured to indicate a charging mode supported by the charging device, and an input voltage of the high voltage charging mode is greater than an input voltage of the low voltage charging mode;

determining the charging mode supported by the charging device as the high voltage charging mode or the low voltage charging mode according to the indication information;

obtaining, via the power line, a power source from the power adapter; and controlling the charging circuit by the charge control device according to the charging mode supported by the charging device and the power source, such that the charging circuit charges the battery in the charging mode supported by the charging device, comprising:

if the charging mode supported by the charging device is the low voltage charging mode, controlling the first switch element to switch on, and controlling the second switch element to switch off, such that the charging circuit is in a bypass mode; and if the charging mode supported by the charging device is the high voltage charging mode, controlling the first switch element and the second switch element to switch on alternately.

2. The method according to claim 1, wherein the first switch element is a first MOSFET transistor, and the second switch element is a second MOSFET transistor.

3. The method according to claim 1, wherein receiving, via the data line, the indication information sent by the charging device, comprises:

receiving, via the data line, the indication information sent by the charging device directly in response to that the charging device is coupled with the charging interface, or sending second indication information to the charging device via the data line in response to that the charging device is coupled with the charging interface, and receiving via the data line, the indication information sent by the charging device for responding to the indication information, wherein the second indication information is configured to query the charging mode supported by the charging device.

4. The method according to claim 1, wherein controlling the charging circuit according to the charging parameter input by the power line of the charging interface and the charging parameter of the battery, such that the charging circuit charges the battery in the charging mode supported by the charging device comprises:

determining whether the battery is fully charged according to the charging parameter input by the power line of the charging interface and the charging parameter of the battery; and if it is determined that the battery is fully charged, controlling the first switch element and the second switch element to switch off, such that the charging device stops charging the battery.

5. The method according to claim 1, wherein the indication information comprises information on protocol version supported by the charging device.

6. The method according to claim 1, wherein:

a first end of the charge control device is coupled with a grid of the first switch element, a second end of the charge control device is coupled with a grid of the second switch element, a source of the first switch element is coupled with a drain of the second switch element, a drain of the first switch element is coupled with the power line of the charging interface, a source of the second switch element is grounded, the charging circuit further comprises an inductance element and a capacitance element, in which a first end of the inductance element is coupled with the source of the first switch element and the drain of the second switch element respectively, a second end of the inductance element is coupled with a first end of the capacitance element and a first end of the battery respectively, and a second end of the capacitance element is coupled with a second end of the battery and grounded.

7. The method according to claim 6, wherein:

the charging circuit comprises a first detecting circuit and a second detecting circuit, the drain of the first switch element is coupled with the power line of the charging interface via the first detecting circuit, two ends of the first detecting circuit are coupled with a third end and a fourth end of the charge control device respectively, and two ends of the second detecting circuit are coupled with a fifth end and a sixth end of the charge control device respectively.

8. A charge control device, applied in an electronic device, wherein the electronic device comprises a charging interface, a charging circuit and a battery coupled in series, the charging circuit comprises a first switch element and a second switch element which can be controlled to make the same charging circuit able to charge the battery in a high voltage charging mode but also able to charge the battery in a low voltage charging mode by only controlling the first switch element and the second switch element, the charging interface comprises a power line and a data line, the power line is configured to charge the electronic device, and the data line is configured to perform communication between the electronic device and a charging device, and the charge control device comprises:

a determining component, comprising a receiver configured to receive indication information sent by the charging device via the data line in response to that the charging device is coupled with the charging interface, and a determining part configured to determine a charging mode supported by the charging device as the high voltage charging mode or the low voltage charging mode according to the indication information received by the receiver in which the indication information is configured to indicate the charging mode supported by the charging device, and an input voltage of the high voltage charging mode is greater than an input voltage of the low voltage charging mode a controller, configured to obtain, via the power line, a power source from the power adapter, and control the charging circuit according to the power source and the charging mode supported by the charging device and determined by the determining component, such that the charging circuit charges the battery in the charging mode supported by the charging device, wherein the controller is further configured to:

if the charging mode supported by the charging device is the low voltage charging mode, control the first switch element to switch on, and control the second switch element to switch off, such that the charging circuit is in a bypass mode; and if the charging mode supported by the charging device is the high voltage charging mode, control the first switch element and the second switch element to switch on alternately.

9. The device according to claim 8, wherein the first switch element is a first MOSFET transistor, and the second switch element is a second MOSFET transistor.

10. The device according to claim 8, wherein:
a first end of the charge control device is coupled with a grid of the first switch element, a second end of the charge control device is coupled with a grid of the second switch element,
a source of the first switch element is coupled with a drain of the second switch element,
a drain of the first switch element is coupled with the power line of the charging interface, a source of the second switch element is grounded,
the charging circuit further comprises an inductance element and a capacitance element, in which a first end of the inductance element is coupled with the source of the first switch element and the drain of the second switch element respectively,
a second end of the inductance element is coupled with a first end of the capacitance element and a first end of the battery respectively, and
a second end of the capacitance element is coupled with a second end of the battery and grounded.

11. The device according to claim 10, wherein:
the charging circuit comprises a first detecting circuit and a second detecting circuit,
the drain of the first switch element is coupled with the power line of the charging interface via the first detecting circuit,
two ends of the first detecting circuit are coupled with a third end and a fourth end of the charge control device respectively, and
two ends of the second detecting circuit are coupled with a fifth end and a sixth end of the charge control device respectively.

12. The device according to claim 10, wherein the controller is further configured to:
determine whether the battery is fully charged according to the charging parameter input by the power line of the charging interface and the charging parameter of the battery; and
if it is determined that the battery is fully charged, control the first switch element and the second switch element to switch off, such that the charging device stops charging the battery.

13. An electronic device, comprising:
a charging interface;
a charging circuit;
a battery coupled in series; and
a charge control device,
wherein the charging circuit comprises a first switch element and a second switch element which can be controlled to make the same charging circuit able to charge the battery in a high voltage charging mode but also able to charge the battery in a low voltage charging mode by only controlling the first switch element and the second switch element, the charging interface comprises a power line and a data line, the power line is configured to charge the electronic device, and the data line is configured to perform communication between the electronic device and a charging device, and
the charge control device comprises:
a determining component, comprising a receiver configured to receive indication information sent by the charging device via the data line in response to that the charging device is coupled with the charging interface, and a determining part configured to determine a charging mode supported by the charging device as the high voltage charging mode or the low voltage charging mode according to the indication information received by the receiver in which the indication information is configured to indicate the charging mode supported by the charging device, and an input voltage of the high voltage charging mode is greater than an input voltage of the low voltage charging mode; and
a controller, configured to obtain, via the power line, a power source from the power adapter, and control the charging circuit according to the power source and the charging mode supported by the charging device and determined by the determining component, such that the charging circuit charges the battery in the charging mode supported by the charging device,
wherein the controller is further configured to:
if the charging mode supported by the charging device is the low voltage charging mode, control the first switch element to switch on, and control the second switch element to switch off, such that the charging circuit is in a bypass mode; and
if the charging mode supported by the charging device is the high voltage charging mode, control the first switch element and the second switch element to switch on alternately.

14. The electronic device according to claim 13, wherein:
a first end of the charge control device is coupled with a grid of the first switch element,
a second end of the charge control device is coupled with a grid of the second switch element,
a source of the first switch element is coupled with a drain of the second switch element;
a drain of the first switch element is coupled with the power line of the charging interface, a source of the second switch element is grounded,
the charging circuit further comprises an inductance element and a capacitance element, in which a first end of the inductance element is coupled with the source of the first switch element and the drain of the second switch element respectively,
a second end of the inductance element is coupled with a first end of the capacitance element and a first end of the battery respectively, and
a second end of the capacitance element is coupled with a second end of the battery and grounded.

15. The electronic device according to claim 14, wherein:
the charging circuit comprises a first detecting circuit and a second detecting circuit,
the drain of the first switch element is coupled with the power line of the charging interface via the first detecting circuit,
two ends of the first detecting circuit are coupled with a third end and a fourth end of the charge control device respectively, and
two ends of the second detecting circuit are coupled with a fifth end and a sixth end of the charge control device respectively.

16. The electronic device according to claim 15, wherein the controller is further configured to:

determine whether charging is abnormal or whether the battery is fully charged according to the charging parameter input by the power line of the charging interface and the charging parameter of the battery; and if it is determined that the charging is abnormal or the battery is fully charged, control the first switch element and the second switch element to switch off, such that the charging device stops charging the battery.

\* \* \* \* \*